US007415241B2

(12) United States Patent
Oprescu-Surcobe et al.

(10) Patent No.: US 7,415,241 B2
(45) Date of Patent: Aug. 19, 2008

(54) METHOD AND APPARATUS FOR REGULATING A DELIVERY OF A BROADCAST-MULTICAST SERVICE IN A PACKET DATA COMMUNICATION SYSTEM

(75) Inventors: Valentin Oprescu-Surcobe, Northbrook, IL (US); Sean S. Kelley, Hoffman Estates, IL (US); William A. Payne, III, Glen Ellyn, IL (US); Joseph R. Smetana, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 677 days.

(21) Appl. No.: 11/135,564

(22) Filed: May 23, 2005

(65) Prior Publication Data

US 2005/0282571 A1 Dec. 22, 2005

Related U.S. Application Data

(60) Provisional application No. 60/576,319, filed on Jun. 2, 2004.

(51) Int. Cl.

| | |
|---|---|
| ***H04H 1/00*** | (2006.01) |
| ***H04B 7/00*** | (2006.01) |
| ***H04Q 7/20*** | (2006.01) |
| *H04M 3/42* | (2006.01) |

(52) U.S. Cl. .................... 455/3.05; 455/3.01; 455/519; 455/453

(58) Field of Classification Search ................ 455/3.01, 455/3.05, 3.06, 503, 414.4, 66.1, 453, 519; 370/338, 321

See application file for complete search history.

(56) References Cited

U.S. PATENT DOCUMENTS

| | | | | |
|---|---|---|---|---|
| 6,628,624 | B1 | 9/2003 | Mahajan et al. | |
| 6,996,410 | B2 * | 2/2006 | Bos et al. | 455/466 |
| 2003/0078001 | A1 * | 4/2003 | Thompson et al. | 455/12.1 |
| 2003/0134651 | A1 | 7/2003 | Hsu | |
| 2003/0145064 | A1 | 7/2003 | Hsu et al. | |
| 2003/0174645 | A1 | 9/2003 | Paratainen et al. | |
| 2003/0189914 | A1 | 10/2003 | Zhao | |
| 2004/0087319 | A1 * | 5/2004 | Bos et al. | 455/458 |
| 2005/0043035 | A1 * | 2/2005 | Diesen et al. | 455/454 |

* cited by examiner

*Primary Examiner*—Tilahun B Gesessse
(74) *Attorney, Agent, or Firm*—Steven A. May

(57) ABSTRACT

A communication system provides one or more of congestion information and subscriber information to a broadcast applications server when the server receives a request to start a broadcast-multicast service in a coverage area. By providing the one or more of congestion information and subscriber information to the server, the server is able to make an informed, intelligent decision concerning blocking, unblocking, downgrading, or upgrading a broadcast-multicast flow of multiple broadcast-multicast flows requested for delivery to, or currently delivered to, the coverage area via a serving base station, and/or whether to add a new broadcast-multicast flow to the broadcast-multicast flows delivered to the coverage area.

53 Claims, 4 Drawing Sheets

METHOD AND APPARATUS FOR REGULATING A DELIVERY OF A BROADCAST-MULTICAST SERVICE IN A PACKET DATA COMMUNICATION SYSTEM

CROSS-REFERENCE TO RELATED APPLICATION

This application claims priority from provisional application Ser. No. 60/576,319, entitled "METHOD AND APPARATUS FOR REGULATING A DELIVERY OF A MULTIMEDIA BROADCAST-MULTICAST SERVICE IN A PACKET DATA COMMUNICATION SYSTEM," filed Jun. 2, 2004, which is commonly owned and incorporated herein by reference in its entirety.

FIELD OF THE INVENTION

The present invention relates generally to packet data communication systems and, in particular, to delivery of a Broadcast-Multicast Service (BCMCS) or a Multimedia Broadcast/Multicast Service (MBMS) in a packet data communication system.

BACKGROUND OF THE INVENTION

The Third Generation Partnership Project Two (3GPP2) standard provides a compatibility standard for cellular mobile telecommunications systems. The 3GPP2 standard ensures that a mobile station (MS), or access terminal (AT), (hereinafter collectively referred to as an MS) operating in a cdma2000 (Code Division Multiple Access 2000) communication system (such as a 1× system or a DO system) can obtain communication services when operating in a system manufactured according to the standards. To ensure compatibility, radio system parameters and data transfer procedures are specified by the standards, including protocols governing digital control messages and bearer traffic that are exchanged over an air interface.

The 3GPP2 standards provide, in the X.P0022, A.S00019, and S.R0083 specifications, for delivery of a Broadcast-Multicast Service (BCMCS) by a cdma2000 communication system to MSs serviced by the system and subscribed to the Service. For example, a BCMCS may deliver a broadcast-multicast flow of audio, video, and/or data associated with a multimedia program such as a Cable News Network (CNN) newscast or an Home Box Office (HBO) show. When a MS activates in a communication system that provides a BCMCS, the MS may request access to one or more broadcast-multicast flows associated with the BCMCS by indicating to the communication system, and in particular to a BCMCS Controller, a willingness to receive multicast data associated with the BCMCS flow. By registering for the BCMCS, and for particular broadcast-multicast flows, the MS joins a broadcast/multicast group associated with those flows.

In response to receiving an access request from a MS for a broadcast-multicast flow, the BCMCS Controller conveys to the MS multiple identifiers (BCMCS_FLOW_ID and BAK_ID) associated with that flow, that is, with the particular program, such as CNN or HBO, subscribed to by the MS and an encryption key (EncrBAK) used to encrypt the audio, video, and/or data associated with that flow. When the BCMCS Controller receives BCMCS data associated with the flow, the BCMCS Controller may cause the data to be encrypted using the EncrBAK key and to be broadcast via a Base Station (BS) or an Access Network (AN) (hereinafter collectively referred to as a BS) servicing the MS. Each subscribed MS may then decrypt the broadcast audio, video, and/or data using the provided key and display the audio, video, and/or data to the user of the MS. When an MS subscribes to multiple BCMCS flows, the MS is provided a Flow ID and an encryption key associated with each such flow. The user of the MS may then select, at any time, which broadcast-multicast flow of the multiple broadcast-multicast flows to decrypt and to listen to or watch.

Currently, the 3GPP2 standards do not regulate a quantity or quality of broadcast-multicast flows conveyed by a BCMCS Controller to a BS and subscribed to by MSs serviced by the BS. That is, in providing broadcast-multicast flows associated with Broadcast-Multicast Services to a BS, the BCMCS Controller may have to provide all flows subscribed to by all MSs serviced by the BS regardless of the available bandwidth or channel conditions at the BS. This unregulated conveyance of flows can produce congestion in the BS due to a lack of available bandwidth for a broadcast of all received flows. As a result, the BS may end up arbitrarily blocking some of the received flows and/or arbitrarily reducing a Quality of Service (QoS) of one or more concurrently received flows. In addition, the BS is unaware of subscription information related to each MS subscribing to one or more such flows and serviced by the BS. For example, when an MS subscribes to a BCMCS, the MS may further specify a particular QoS for the Service, for example, to a Gold, Silver, or Bronze plan, or may understand that a particular BCMCS will be provided at a predetermined QoS. When the BS arbitrarily blocks received flows or arbitrarily reduces QoS, the BS may block broadcast-multicast flows subscribed to by a large number of subscribers while broadcasting broadcast-multicast flows with a low number of subscribers or may reduce QoS to an unacceptably low level. The result is frustrated subscribers and angry system operators.

Therefore, a need exists for a method and apparatus for regulating the delivery of BCMCS by a BCMCS Controller to a BS.

DETAILED DESCRIPTION OF THE INVENTION

Figure 1:
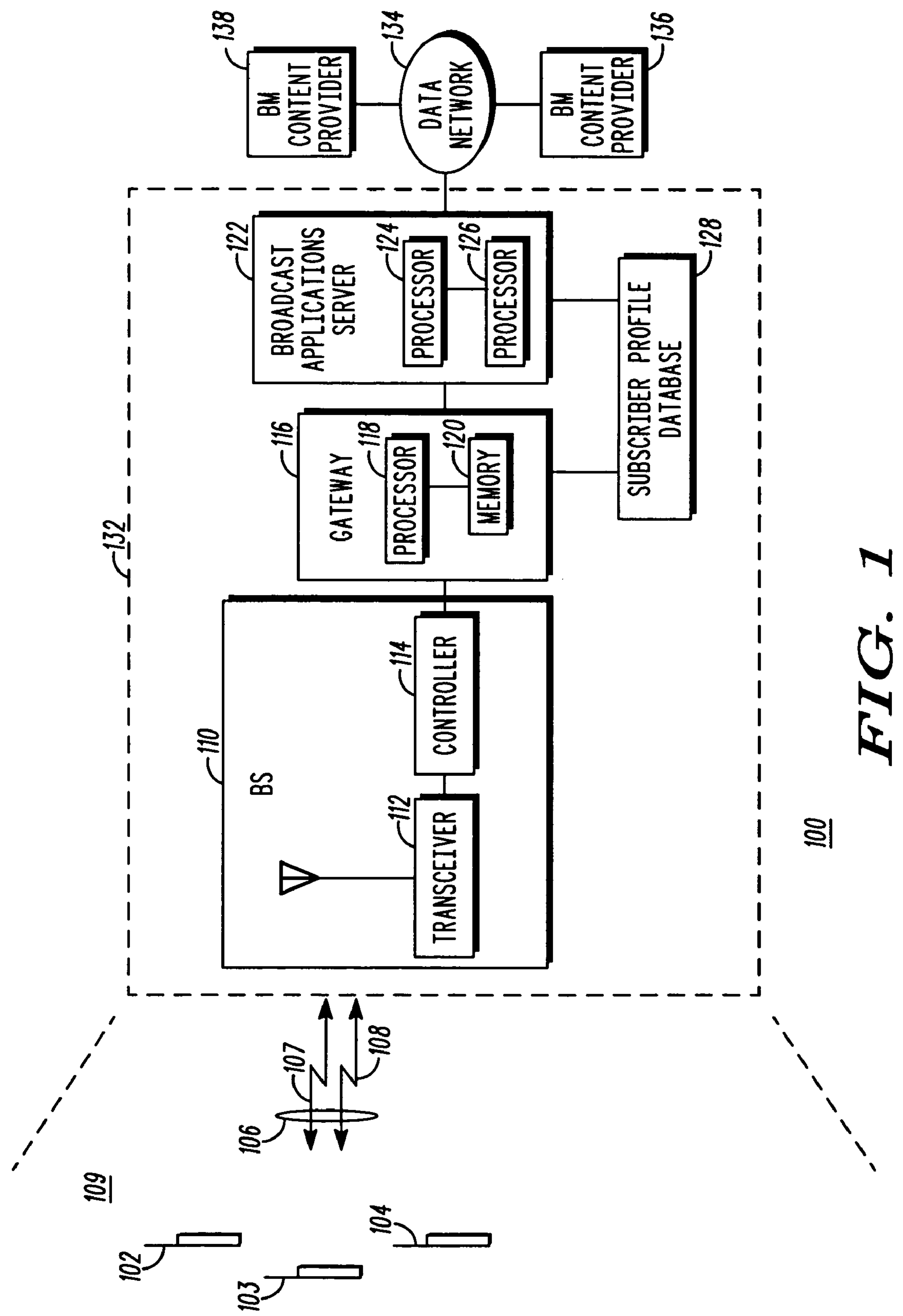
FIG. 1 is a block diagram of a wireless communication system in accordance with an embodiment of the present invention.

To address the need for a method and an apparatus that regulates the provision of Broadcast-Multicast Services (BCMCS) by a BCMCS Controller to a base station (BS), a communication system provides one or more of congestion information and subscriber information to a broadcast applications server when the server receives a request to start a broadcast-multicast service in a coverage area. By providing the one or more of congestion information and subscriber information to the server, the server is able to make an informed, intelligent decision concerning blocking, unblocking, downgrading, or upgrading a broadcast-multicast flow of multiple broadcast-multicast flows requested for delivery to, or currently delivered to, the coverage area via a serving base station, and/or whether to add a new broadcast-multicast flow to the broadcast-multicast flows delivered to the coverage area.

Generally, an embodiment of the present invention encompasses a method for providing a broadcast-multicast service. The method comprises receiving at least one request to start service for multiple broadcast-multicast flows in a coverage area of a same base station, and further receiving information concerning congestion in the coverage area. The method further comprises determining one or more of blocking a broadcast-multicast flow of the multiple broadcast-multicast flows, unblocking a broadcast-multicast flow of the multiple broadcast-multicast flows, downgrading a broadcast-multicast flow of the multiple broadcast-multicast flows, upgrading a broadcast-multicast flow of the multiple broadcast-multicast flows, and adding a new broadcast-multicast flow for delivery in the coverage area based on the received congestion information.

In response to determining to block a broadcast-multicast flow, a transmission of the broadcast-multicast flow is blocked in the coverage area. In response to determining to unblock a broadcast-multicast flow, a transmission of the broadcast-multicast flow is unblocked in the coverage area. In response to determining to downgrade a broadcast-multicast flow, downgrading a broadcast-multicast flow is downgraded prior to transmitting the broadcast-multicast flow in the coverage area. In response to determining to upgrade a broadcast-multicast flow, a broadcast-multicast flow is upgraded prior to transmitting the broadcast-multicast flow in the coverage area. In response to determining to add a new broadcast-multicast flow, a new broadcast-multicast flow is added in the coverage area.

Another embodiment of the present invention encompasses a method for providing a broadcast-multicast service. The method comprises receiving at least one request to start service for multiple broadcast-multicast flows in a coverage area of a same base station, and further receiving preference information associated with the plurality of broadcast-multicast flows. The method further comprises determining one or more of blocking a broadcast-multicast flow of the multiple broadcast-multicast flows, unblocking a broadcast-multicast flow of the multiple broadcast-multicast flows, downgrading a broadcast-multicast flow of the multiple broadcast-multicast flows, upgrading a broadcast-multicast flow of the multiple broadcast-multicast flows, and adding a new broadcast-multicast flow for delivery in the coverage area based on the received preference information.

In response to determining to block a broadcast-multicast flow, a transmission of a broadcast-multicast flow is blocked in the coverage area. In response to determining to unblock a broadcast-multicast flow, a transmission of a broadcast-multicast flow is unblocked in the coverage area. In response to determining to downgrade a broadcast-multicast flow, a broadcast-multicast flow is downgraded prior to transmitting the broadcast-multicast flow in the coverage area. In response to determining to upgrade a broadcast-multicast flow, a broadcast-multicast flow is upgraded prior to transmitting the broadcast-multicast flow in the coverage area. In response to determining to upgrade a broadcast-multicast flow, a new broadcast-multicast flow is added to the broadcast-multicast flows delivered in the coverage area.

Yet another embodiment of the present invention encompasses a broadcast applications server that includes a processor. The processor receives at least one request to start service for multiple broadcast-multicast flows in a coverage area of a same base station. The processor further receives information concerning congestion in the coverage area. Based on the received congestion information, the processor determines one or more of blocking a broadcast-multicast flow of the plurality of broadcast-multicast flows, unblocking a broadcast-multicast flow of the plurality of broadcast-multicast flows, downgrading a broadcast-multicast flow of the plurality of broadcast-multicast flows, upgrading a broadcast-multicast flow of the plurality of broadcast-multicast flows, and adding a new broadcast-multicast flow for delivery in the coverage area.

In response to determining to block a broadcast-multicast flow, the processor blocks a transmission of the broadcast-multicast flow in the coverage area. In response to determining to unblock a broadcast-multicast flow, the processor unblocks a transmission of the broadcast-multicast flow in the coverage area. In response to determining to downgrade a broadcast-multicast flow, the processor downgrades a broadcast-multicast flow prior to transmission of the broadcast-multicast flow in the coverage area. In response to determining to upgrade a broadcast-multicast flow, the processor upgrades a broadcast-multicast flow prior to transmission of the broadcast-multicast flow in the coverage area.

Still another embodiment of the present invention encompasses a broadcast applications server that includes a processor. The processor receives at least one request to start service for a plurality of broadcast-multicast flows in a coverage area of a same base station. The processor further receives preference information associated with the plurality of broadcast-multicast flows. Based on the received preference information, the processor determines one or more of blocking a broadcast-multicast flow of the plurality of broadcast-multicast flows, unblocking a broadcast-multicast flow of the plurality of broadcast-multicast flows, downgrading a broadcast-multicast flow of the plurality of broadcast-multicast flows, upgrading a broadcast-multicast flow of the plurality of broadcast-multicast flows or unblocking a broadcast-multicast flow of the plurality of broadcast-multicast flows, and adding a new broadcast-multicast flow for delivery in the coverage area.

In response to determining to block a broadcast-multicast flow, the processor blocks a transmission of a broadcast-multicast flow in the coverage area. In response to determining to unblock a broadcast-multicast flow, the processor unblocks a transmission of a broadcast-multicast flow in the coverage area. In response to downgrade a broadcast-multicast flow, the processor downgrades a broadcast-multicast flow prior to transmitting the broadcast-multicast flow in the coverage area. In response to determining to upgrade a broadcast-multicast flow, the processor upgrades a broadcast-multicast flow prior to transmitting the broadcast-multicast flow in the coverage area.

The present invention may be more fully described with reference to FIGS. 1-5. FIG. 1 is a block diagram of a wireless communication system 100 in accordance with an embodiment of the present invention. Communication system 100 includes at least one Base Station (BS), Access Network (AN), or Radio Access Network (RAN) (hereinafter collectively referred to as a BS) 110. BS 110 includes at least one transceiver 112, such as a Base Transceiver Station (BTS), an Access Point (AP), or a Node B, that is operationally coupled to a network controller 114, such as a Base Station Controller (BSC), a Radio Network Controller (RNC), or a Packet Control Function (PCF). BS 110 provides communications services to mobile communication devices, such as mobile stations (MSs), Access Terminals (ATs), or User Equiptment (UEs) (hereinafter collectively referred to as MSs) located in a coverage area 109, such as a cell or sector, serviced by the BS via an air interface 106. Air interface 106 comprises a downlink 107 and an uplink 108 that each includes multiple radio frequency (RF) resources, that is, RF communication channels. Downlink 107 preferably includes a paging channel, at least one downlink pilot channel, at least one downlink control channel, and at least one downlink bearer channel. Uplink 108 preferably includes an uplink access channel and at least one uplink control channel. In general, and unrelated to broadcast, the uplink may further include at least one uplink bearer channel.

Communication system 100 further includes multiple mobile stations (MSs), access terminals (ATs), or user equipment (UEs), 102-104 (three shown) (hereinafter collectively referred to as MSs) that reside in coverage area 109 of BS 110 and that are serviced by the BS. One of ordinary skill in the art realizes that each MS 102-104 may be any of, but not limited to, a cellular telephone, a radio telephone, a personal digital assistant (PDA) with radio frequency (RF) capabilities, or a wireless modem that provides an RF interface for digital terminal equipment (DTE) such as a laptop computer. Each MS 102-104 is capable of receiving and displaying audio, video, and/or data associated with a broadcast-multicast service provided by communication system 100, which service provides for a distribution of broadcast-multicast service data to MSs subscribed to the broadcast-multicast service.

Communication system 100 further includes a gateway 116, such as a Packet Data Serving Node (PDSN), and/or a Broadcast Serving Node (BSN), or a Serving GPRS Support Node (SGSN) and a Gateway GPRS Support Node, that is operationally coupled to BS 110, a broadcast application server 122, such as a Broadcast-Multicast Service (BCMCS) Controller and/or a BCMCS content server, or a Broadcast Multicast Service Center (BM-SC) and possibly other servers such as a User Support Server, in communication with network controller 114, and a subscriber profile database 128 that is operationally coupled to each of the broadcast applications server and the gateway. In various embodiments of the present invention, subscriber profile database 128 may reside in an Authentication, Authorization, Accounting entity (AAA) (not shown), a Home Location Register (HLR) (not shown), or a Home Subscriber Server (HSS) (not shown), may be distributed among them, or may be an entity separate from them. Each of BS 110, gateway 116, broadcast applications server 122, and subscriber profile database 128 comprises a network element of a wireless network 132.

Communication system 100 further includes multiple broadcast-multicast (BM) content providers 136, 138 (two shown). Each BM content provider 136, 138 is coupled to wireless network 132, and in particular to server 122, via a data network 134. As part of a broadcast-multicast service provided by communication system 100 and that may be subscribed to by each MS 102-104, each BM content provider 136, 138 sources broadcast-multicast service data to subscribed MSs, such as MSs 102-104, via server 122, gateway 116, and BS 110.

Communication system 100 provides a broadcast-multicast service capable of delivering multiple broadcast-multicast flows to MSs, such as MSs 102-104, subscribed to the service. For example, a broadcast-multicast flow may comprise a broadcast of audio, video, and/or data associated with a multimedia program, such as a Cable News Network (CNN) newscast, a Home Box Office (HBO) show, or a sporting event, such as a soccer game or a baseball game. Preferably, communication system 100 is a Code Division Multiple Access (CDMA) 2000 communication system that operates in accordance with the 3GPP2 (Third Generation Partnership Project 2) standards. The 3GPP2 standards provide a compatibility standard for CDMA 2000 air interfaces (both 1× and DO) and specify wireless telecommunications system operating protocols, including radio system parameters, call processing procedures, and provision of a broadcast-multicast service, that is, a Broadcast-Multicast Service (BCMCS). BCMCSs are described in detail in the 3GPP2 (Third Generation Partnership Project Two) X.P0022, A.S00019, C.S0054 and S.R0083 specifications, which specifications are hereby incorporated herein in their entirety and copies of which may be obtained from the 3GPP2 via the Internet or from the 3GPP2 Secretariat with administrative offices at 2500 Wilson Boulevard, Suite 300, Arlington, Va. 22201 (USA).

In another embodiment of the present invention, communication system 100 may be a Universal Mobile Telecommunication Service (UMTS) or a GPRS communication system that operates in accordance with the 3GPP (Third Generation Partnership Project) standards. The 3GPP standards also specify wireless telecommunications system operating protocols and further specify delivery of a broadcast-multicast service, that is, a Multimedia Broadcast/Multicast Service (MBMS), in 3GPP (Third Generation Partnership Project) TS (Technical Specification) 23.246, TS 22.146, TS 25.346, and TS 29.846, which specifications are hereby incorporated herein in their entirety. In yet other embodiments of the present invention, communication system 100 may operate in accordance with any other wireless telecommunication system, such as but not limited to a Time Division Multiple Access (TDMA) communication system, or an Orthogonal Frequency Division Multiple Access (OFDM) communication system.

Figure 2:
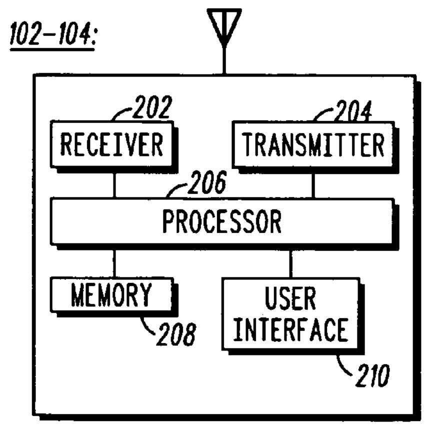
FIG. 2 is a block diagram of a mobile station of FIG. 1 in accordance with an embodiment of the present invention.

Referring now to FIGS. 1 and 2, each of MSs 102-104, gateway 116, and server 122 includes a respective processor 206, 118, 124, such as one or more microprocessors, microcontrollers, digital signal processors (DSPs), combinations thereof or such other devices known to those having ordinary skill in the art. Each of MSs 102-104, gateway 116, and server 122 further includes a respective at least one memory device 208, 120, 126 associated with the respective processor, such as random access memory (RAM), dynamic random access memory (DRAM), and/or read only memory (ROM) or equivalents thereof, that store an identifier associated with the MS gateway, or server, such as statically or dynamically assigned identifier or a statically or dynamically assigned routing address, such as an IP (Internet Protocol) address, and other data and programs that may be executed by the processor and allow the processor to operate in communication system 100.

At least one memory device 126 of server 122 further maintains one or more identifiers associated with each broadcast-multicast flow provided by the server, for example, a flow identifier (BCMCS_FLOW_ID) and a Broadcast Access Key identifier (BAK_ID) associated with the flow, and an encryption key, for example, EncrBAK, that is employed to encrypt data associated with the broadcast-multicast flow. In addition, at least one memory device 126 of server 122 further maintains, in association with each broadcast-multicast flow provided by the server, service transmission parameters of the broadcast-multicast flow, such as a recommended data rate, or bandwidth, a recommended Quality of Service (QoS), a class of service associated with the flow, an indication of whether the flow may be a premium (higher, or extra, subscription rate) flow, and a list of gateways, such as gateway 116, BSs, such as BS 110, and/or MSs, such as MSs 102-104, that are subscribed to the broadcast-multicast flow.

In various embodiments of the present invention, the at least one memory device 208 of each MS 102-104 may comprise a permanent memory device that typically is removed from the MS by a service technician and/or a removable memory device, such as a memory stick, a Subscriber Identity Module (SIM), or a User Identity Module (UIM), that may be removed by a user of the MS. Each of MSs 102-104 further includes a receiver 202 and a transmitter 204 that are operationally coupled to processor 206 and that respectively provide for receiving and transmitting messages by the MS. Unless otherwise specified herein, all functions described as being performed herein by an MS 102-104, gateway 116, or server 122 are performed by the respective processor 206, 118, and 124 of the MS, gateway and server.

Subscriber profile database 128 maintains a mobile identifier (mobile ID) associated with each MS, such as MS 102, subscribing to the services of communication system 100 and further maintains and tracks provisioning and mobility information with respect to each such MS, including registration of the MS when the MS activates in communication system 100. Subscriber profile database 128 further maintains, in association with the mobile ID, a subscriber profile for the MS. The subscriber profile includes capabilities of, and applications supported by, the MS and services, such as a broadcast-multicast service and particular broadcast-multicast flows, delivered by communication system 100 and subscribed to by the MS. Each subscriber profile may further maintain, in association with each broadcast-multicast flow, the details of the subscription to the flow, such as a price, that is, a subscription rate, of the flow subscribed to by the subscriber.

Each subscriber profile maintained in subscriber profile database 128 may further include any service plans subscribed to by the user or service preferences provided by the user. For example, a user of the MS may subscribe to a Gold plan, a Silver plan, or a Bronze plan for an extra fee. A Gold plan subscriber may be assured a higher Quality of Service (QoS) than a QoS assured to Silver and Bronze plan subscribers or may be assured that a QoS will not be reduced. A Gold plan subscriber may further be accorded a higher priority than the Silver and Bronze plan subscribers. For example, when bandwidth is limited, then the Gold plan subscriber may be allocated a bearer channel before bearer channels are allocated to the Silver or Bronze plan subscribers. Similarly, Silver plan subscribers may be assured higher QoS and priority than Bronze plan subscribers and Bronze plan subscribers may be accorded higher QoS and priority than non-plan subscribers.

With respect to any broadcast-multicast service subscribed to by a user of each of MSs 102-104, the subscriber profile for the MS maintained in subscriber profile database 128 may further include one or more of the following: a listing of subscribed broadcast-multicast flows subscribed to by the MS, that is, by the user of the MS, an order of preference of the broadcast-multicast flows, for example, a prioritization of CNN relative to HBO, and a QoS associated with one or more of the listed broadcast-multicast flows, which QoS may be a recommended, desired, or subscribed to QoS. For example, a desired or subscribed to QoS or bandwidth may correspond to a minimum QoS or bandwidth subscribed to by the MS or a QoS or bandwidth associated with a Gold, Silver, or Bronze plan subscribed to by the MS.

The subscriber profile associated with each MS 102-104 may be further maintained in the at least one memory device 208 of the MS. By maintaining the subscriber profile in a removable memory device, a subscriber to a broadcast-multicast service may be able to transfer his or her list of subscribed services, preferences, and service plans to whatever MS the subscriber is using at the time.

In order to receive a broadcast-multicast flow associated with the broadcast-multicast service provided by communication system 100, a user of an MS 102-104, such as MS 102, must subscribe to the service and the flow. In one embodiment of the present invention, the user may pre-register for the service and the flow, for example, by signing an agreement with an operator of system 100 for provision of the service and flow at an agreed upon price, that is, subscription rate. The operator of system 100 may then store this subscription information in a profile of the subscriber maintained in subscriber profile database 128 and further store an identifier associated with the flow in the at least one memory device 208 of the user's MS. When the MS activates in communication system 100, the MS may at any time receive the subscribed to broadcast-multicast flow by having a registration request conveyed to broadcast application server 122 via BS 110 and gateway 116. The registration request includes the identifier associated with the flow, thereby informing server 122 of the flow being registered for.

In another embodiment of the present invention, the user may subscribe to the broadcast-multicast service and broadcast-multicast flow on an ad hoc basis. In such an embodiment, network 132, and in particular broadcast application server 122, may inform an MS of the broadcast-multicast flow by broadcasting a service announcement or a message of service availability that includes an identifier associated with the flow and information such as a date, time, program title, and price associated with the flow. In response to receiving the service announcement or message, a user of the MS may subscribe to the broadcast-multicast flow by conveying to the communication system, and in particular to gateway 116 or to broadcast application server 122 via the gateway, a registration request that indicates a willingness to receive broadcast-multicast service data associated with the flow. Again, the registration request includes the identifier associated with the flow, thereby informing server 122 of the flow being registered for.

In response to receiving a request to register for the broadcast-multicast flow from an MS, such as MS 102, or from a gateway, such as gateway 116, broadcast application server 122 stores an identifier associated with the gateway, the served BS, and/or the subscribing MS, in the one or more memory devices 126 of the server. Broadcast application server 122 may further retrieve the subscriber profile associated with the MS from subscriber profile database 128 and may set up an accounting record with an accounting system, such as an AAA (not shown), in order to bill the MS for provision of the service. Alternatively, the accounting may be done at gateway 116.

In addition, in response to receiving the registration request, broadcast application server 122 conveys to the MS, via the gateway serving the MS, one or more identifiers uniquely associated with the broadcast-multicast flow, for example, a BCMCS flow identifier (BCMCS_FLOW_ID) and a Broadcast Access Key identifier (BAK_ID) with respect to a BCMCS flow. Broadcast application server 122 may further convey to the MS information that may be used by the MS to receive, decode, and display the data associated the broadcast-multicast flow, such as a start time of the flow, decoding information such as a compression algorithm, for example, MPEG4, used to compress the data, and an encryption key, or example, EncrBAK, used to encrypt the data. By employing an encryption key to encrypt and decrypt the broadcast-multicast flow, only subscribed MSs can receive, decrypt, and decode the flow. When a user of an MS subscribes to multiple flows of a broadcast-multicast service, the MS may use the broadcast-multicast flow identifier, for example, the BCMCS_FLOW_ID, associated with each flow to distinguish among the subscribed flows and to allow the user of the MS to select a flow to listen to or watch. The MS may then use an associated encryption key, for example, EncrBAK, to decrypt and display the flow on a user interface 210 of the MS when the data is received in an encrypted format.

Broadcast applications server 122 provides a central point for a distribution, to subscribed MSs, of the multiple broadcast-multicast flows associated with the broadcast-multicast service provided by communication system 100. When broadcast application server 122 receives data associated with a broadcast-multicast flow from a broadcast-multicast content provider 136, 138, the broadcast application server conveys the data to each subscribed MS, such as MSs 102-104, via a BS servicing the MS, that is, BS 110, which BS transmits the data by broadcasting or multicasting the data via a bearer channel of an associated air interface downlink, that is, downlink 107. Prior to conveying the data, broadcast application server 122 may have the data encrypted using the encryption key, such as an EncrBAK key, distributed to the subscribed MSs. Each subscribed MS may then decrypt the broadcast audio, video, and/or data using the provided key and display the audio, video, and/or data to the user of the MS via user interface 210.

When the multiple MSs 102-104 serviced by BS 110 subscribe to multiple broadcast-multicast flows, a provision of each flow to each subscribed MS may produce congestion in air interface 106 of coverage area 109 associated with the BS. That is, an assignment of a bearer channel to each broadcast-multicast flow of the multiple broadcast-multicast flows may produce unacceptable levels of interference for the other broadcast-multicast flows of the multiple broadcast-multicast flows, or may produce unacceptable levels of interference for other users of air interface 106. In addition, BS 110 may lack the available bandwidth, such as a sufficient quantity of bearer channels, to provide all broadcast-multicast flows subscribed to by MSs 102-104, or channel conditions in air interface 106 may be too poor to support the provision of all broadcast-multicast flows that are subscribed to by the MSs. In order to resolve such problems, communication system 100 provides a method and apparatus for regulating a delivery of a broadcast-multicast service, and in particular of broadcast-multicast flows provided by a BS to subscribed MSs, for example, when a quantity or quality of broadcast-multicast services provided by the BS is constrained by bandwidth limitations or channel conditions or may congest the air interface.

Figure 3:
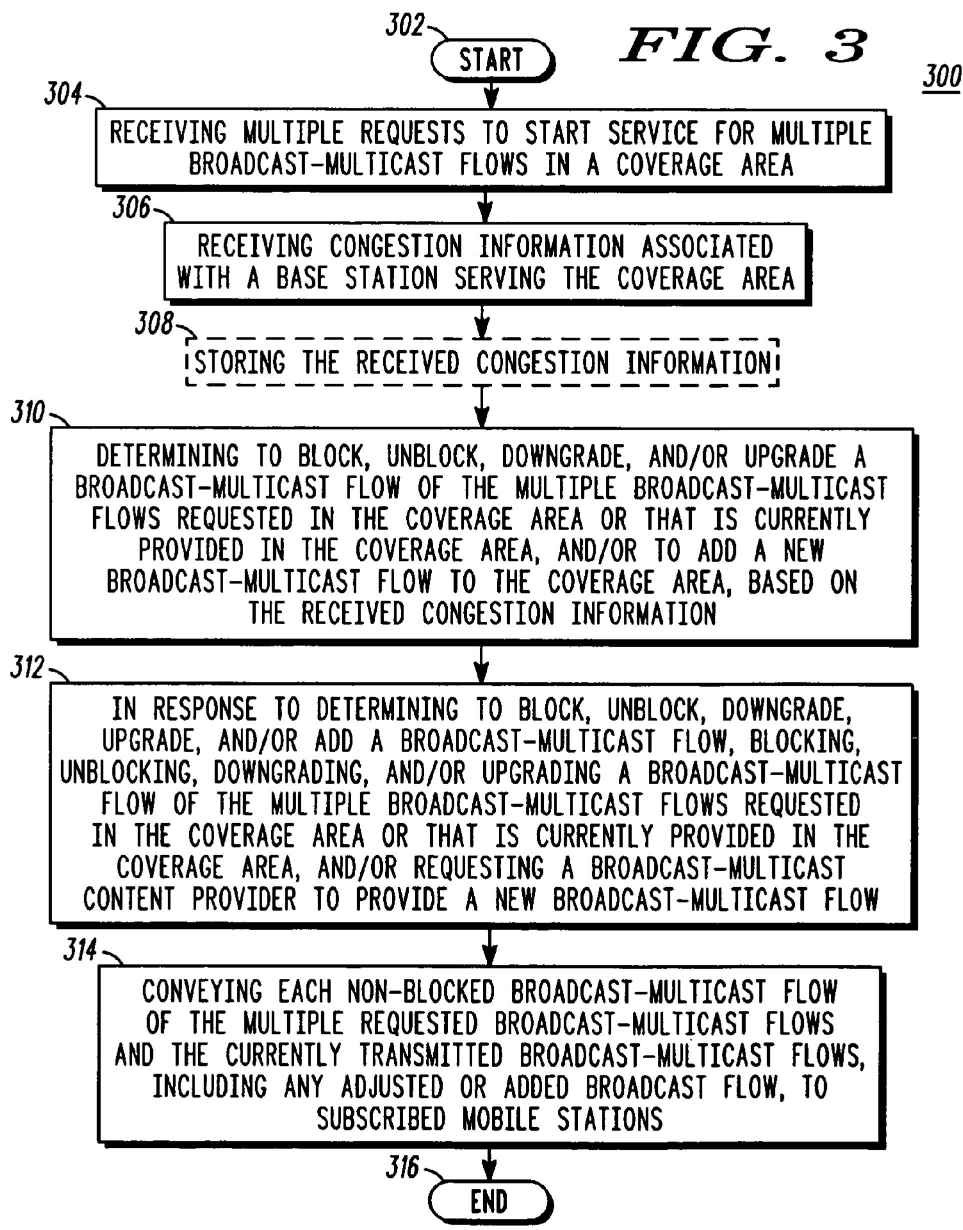
FIG. 3 is a logic flow diagram of a method by which the communication system of FIG. 1 regulates the delivery of a broadcast-multicast service in accordance with an embodiment of the present invention.

Referring now to FIG. 3, a logic flow diagram 300 is depicted that illustrates a method by which communication system 100 regulates a delivery of a broadcast-multicast service in accordance with an embodiment of the present invention. Logic flow diagram 300 begins (302) when communication system 100, and in particular BS 110, receives multiple requests to start service for multiple broadcast-multicast flows in a coverage area, that is, coverage area 109, of the BS. Each request of the multiple requests is associated with an MS of the multiple MSs 102-104 serviced by BS 110, indicates a desire of the MS to receive a broadcast-multicast flow of the multiple broadcast-multicast flows associated with the broadcast-multicast service, and includes a mobile ID associated with the MS and a flow identifier associated with the desired broadcast-multicast flow. For example, each request may comprise a BCMCS Register message. For example, the MS may convey the request when the MS activates in communication system 100 or is handed off to BS 110. By way of another example, the MS may convey the request in response to receiving an announcement of the broadcast-multicast flow or a message informing of the availability of the flow from network 132. When BS 110 receives the multiple requests, the BS already may be providing one or more of the requested broadcast-multicast flows, or may be providing other broadcast-multicast flows, to MSs in coverage area 109.

In response to receiving each request to start service, BS 110 conveys to a broadcast applications server servicing the BS, that is, broadcast applications server 122, and the broadcast applications server receives (304) from the BS, a corresponding request to start service. In one embodiment of the present invention, the BS may forward the request to start service received by the BS. In another embodiment of the present invention, in response to receiving each request to start service, the BS may assemble another request to start service, which assembled request includes the mobile ID and the flow identifier included in the request received by the BS, and then convey the assembled request to broadcast applications server 122.

In addition, in response to receiving each request to start service, BS 110 conveys to broadcast applications server 122, and the broadcast applications server receives (306) from the BS, and may store (308) in the at least one memory device 126 of the server, information concerning congestion at the BS, such as an availability of RF resources or transmit power at the BS and/or channel conditions at the BS. In one embodiment of the present invention, BS 110 may attach the congestion information, as an information element, to the request for service received by the BS and forward the information along with the request. In other embodiments of the present invention, in response to receiving the request for service, BS 110 may include the congestion information in the request to start service assembled by the BS or may assemble a separate message containing the congestion information and then convey the congestion information to broadcast applications server 122 in the assembled request to start service or in the separate message.

As one of ordinary skill in the art realizes, BS 110 is aware of the RF resources, or communication channels, available at the BS and the power allocated to each communication channel currently transmitted by the BS. Accordingly, BS 110 may generate the congestion information, that is, information concerning RF resource availability and/or available or allocated transmit power to broadcast applications server 122. It is also known in the art that MSs serviced by a BS, such as MSs 102-104 serviced by BS 110, may monitor channel conditions by monitoring pilot channels transmitted by the BS, determining signal quality metrics, such as signal strength measurements or signal-to-noise ratios, with respect to the monitored pilot channels, and conveying the determined signal quality metrics back to the BS in cases when an uplink was established. BS 110 may then forward the received signal quality metrics to broadcast applications server 122.

BS 110 may also self-determine channel conditions by determining signal quality metrics, such as signal-to-noise ratios, bit error rates (BER), or frame error rates (FER), with respect to signals received from each MS 102-104 serviced by the BS in cases when uplinks are available. For example, signal quality metrics typically are determined by a BS with respect to frames of data received from an MS that is operating in soft handoff. BS 110 may then forward the determined signal quality metrics to broadcast applications server 122.

The conveyance of congestion information, such as RF resource availability, power availability, or channel condition information, by BS 110 to broadcast applications server 122 may be singular, periodic, or intermittent. For example, BS 110 may convey RF resource availability information to broadcast applications server 122 whenever a new broadcast or multicast bearer channel is released or is assigned, or may periodically convey updates of RF resource availability. By way of another example, it is well known that MSs such as MSs 102-104 may periodically report their pilot channel measurements, may report such measurements only when the measurements change from previous measurements by more than a predetermined amount, or may report such measurements only when the measurements fall below, or rise above, a predetermined threshold. BS 110 may then forward such measurements whenever such measurements are received or may executed an algorithm stored in controller 114 for determining whether or not to forward such measurements. Numerous algorithms may occur to one of ordinary skill in the art for determining when BS 110 may forward such measurements to broadcast applications server 122. The use of any one particular algorithm, such as storing the received measurements and periodically forwarding the measurements most recently received from each serviced MS, or forwarding periodically received measurements only when a predetermined number of measurements fall below or rise above a threshold, is up to the designer of system 100 and is not critical to the present invention.

In addition, the conveyance of congestion information may result from a request from such information conveyed by broadcast applications server 122 to BS 110, in response to which the BS self-determines such information as described herein or requests such information from each MS 102-104. In response to receiving a request for congestion information from the BS, each MS may then convey congestion information to the requesting BS as described herein.

Based on the congestion information received from BS 110, broadcast applications server 122 then determines (310) to block or unblock a broadcast-multicast flow of the multiple broadcast-multicast flows that are requested for provision in coverage area 109 or are currently provided in coverage area 109. Broadcast applications server 122 may further, or alternatively, determine (310) to downgrade or upgrade a transmission parameter of a broadcast-multicast flow of the multiple requested or currently provided broadcast-multicast flows. In addition, or again alternatively, broadcast applications server 122 may determine (310) to add a broadcast-multicast flow to the broadcast-multicast flows provided in coverage area 109, that is, to request a broadcast-multicast content provider 136, 138 to make a new flow available for broadcasting in the coverage area.

In one embodiment of the present invention, step 310 may comprise the following steps. Broadcast applications server 122 may determine, based on the received congestion information, that transmitting all broadcast-multicast services requested by MSs 102-104 would result in congestion at BS 110. For example, broadcast applications server 122 may determine that BS 110 lacks sufficient bandwidth or sufficient unallocated power to transmit all requested broadcast-multicast services. By way of another example, broadcast applications server 122 may determine that the power required to transmit all broadcast-multicast services requested by MSs 102-104 may result in unacceptable levels of interference with each such service or with other on-going communications at BS 110. For example, broadcast applications server 122 may compare each signal quality metric received from BS 110 to a signal quality metric threshold to produce a comparison. Based on the comparisons, such as an amount of a difference between the threshold and each metric, broadcast applications server 122 may determine that transmitting all broadcast-multicast services requested by MSs 102-104 would cause an unacceptable deterioration in these metrics and/or comparisons.

In response to determining that transmitting all broadcast-multicast service instances requested by MSs 102-104 would result in congestion at BS 110, broadcast applications server 122 may further determine to transmit fewer than the requested number of broadcast-multicast flows, that is, to block one or more of the requested or currently provided broadcast-multicast flows, or may determine to downgrade one or more of the requested or currently provided flows, for example, by adjusting downward the transmission parameters of one or more of the requested or currently provided flows or by adjusting a class of service of one or more of the requested or currently provided flows. For example, broadcast applications server 122 may determine to adjust downward the transmission parameters of one or more of the requested flows by transmitting the one or more flows at a reduced bandwidth or at a reduced QoS. By way of another example, broadcast applications server 122 may determine to transmit one or more of the flows at a different class of service by deferring a broadcast of a real time streaming service, for example, by converting the service into a non-real time background download.

In another embodiment of the present invention, broadcast applications server 122 may determine, at step 310 and based on the received congestion information, that the RF resource availability, transmit power availability, or channel conditions are such that BS 110 can support additional broadcast-multicast flows or an upgraded version of one or more requested or currently provided broadcast-multicast flows. For example, the congestion information may indicate that sufficient bandwidth or power is available at BS 110, or that channel conditions are sufficiently improved, to allow the broadcast applications server to unblock a currently blocked broadcast-multicast flow, to adjust upward the transmission parameters of one or more of the requested or currently provided flows, or to request a broadcast-multicast content provider 136, 138 to make a new flow available for broadcasting in coverage area 109.

In response to determining to block, unblock, downgrade, upgrade, or add a broadcast-multicast flow at BS 110, broadcast applications server 112 then selects a broadcast-multicast flow to respectively block, unblock, downgrade, upgrade, or add. In selecting a broadcast-multicast flow to block, unblock, downgrade, upgrade, or add, broadcast applications server 122 may select a flow by executing an algorithm that considers any one or more of a priority assigned to each such flow, a recommended bandwidth and/or QoS of the flow, or class of service requirement of the flow. For example, when considering just a single factor, broadcast applications server 122 may determine to block, or reduce the bandwidth or QoS of, or change the class of service of, a requested or a currently transmitted broadcast-multicast flow with a fewest subscribed MSs or a lowest priority. By way of another example, broadcast applications server 122 may determine to reduce a data rate of a highest data rate flow, such as broadcasting a flow with an associated data rate of 64 kilobits per second (kbps) instead at a data rate of 32 kbps. By way of yet another example, broadcast applications server 122 may determine to reduce the bandwidth, QoS, or class of service of multiple broadcast-multicast flows provided via BS 110 so that all requested and currently transmitted broadcast-multicast flows may be provided. Alternatively, if the broadcast applications server determines that higher bandwidth is available it may increase or restore previous levels of service.

In other embodiments of the present invention, in selecting a broadcast-multicast flow to block, unblock, downgrade, upgrade, or add, the algorithm executed by broadcast applications server 122 may further consider, or alternatively consider, operational goals associated with a provision, at BS 110, of each broadcast-multicast flow, such as maximizing a quantity of MSs receiving the broadcast-multicast flows, maximizing a quantity of flows provided, or maximizing revenues generated by provision of the flows. For example, when broadcast applications server 122 selects a broadcast-multicast flow to block or downgrade, the server may select a flow with a fewest number of subscribed MSs, a flow that is a non-premium flow, or a flow with a high data rate or a high QoS requirement. When the server selects a broadcast-multicast flow to unblock, upgrade, or add, the server may select a flow with a largest number of requesting MSs or a premium broadcast-multicast flow subscribed to the MSs, or may select flows with low data rates or low QoS so that a larger quantity of flows may be unblocked or added.

Broadcast applications server 122 then blocks, unblocks, downgrades, upgrades, or adds (312) the selected broadcast-multicast flow. Broadcast applications server 122 then conveys (314) each non-blocked broadcast-multicast flow of the multiple requested or on-going broadcast-multicast flows, including any downgraded or upgraded broadcast-multicast flows and any added broadcast flows, to BS 110. BS 110 broadcasts the broadcast-multicast flows received from broadcast applications server 122 to subscribed MSs and logic flow 300 then ends (316).

In other embodiments of the present invention, in support of converged networks and next generation networks, by blocking the broadcast-multicast flow to one destination and unblocking it to another, the broadcast application server is able to redirect a flow from one network to another network (of same or different type) or from one device to another device, based on user preferences and congestion situations.

By providing congestion information to broadcast applications server 122 when the server receives a request to start service, the server is able to make an intelligent decision in regard to blocking, unblocking, downgrading, upgrading, and adding a broadcast-multicast flow. For example, broadcast applications server 122 may block, reduce a bandwidth or QoS, or change a class of service, of a broadcast-multicast flow with a fewest subscribed MSs or a lowest priority, or may reduce a data rate of a highest data rate flow. By way of yet another example, broadcast applications server 122 may reduce a bandwidth or QoS, or change a class of service, of multiple broadcast-multicast flows provided via BS 110 so that all requested and currently transmitted broadcast-multicast flows may be provided. When broadcast applications server 122 determines that higher bandwidth is available, the server may increase or restore previous levels of service.

In addition, in blocking, unblocking, downgrading, upgrading, and adding a broadcast-multicast flow, broadcast applications server 122 may optimize one or more operational goals associated with a provision, at BS 110, of each broadcast-multicast flow, such as maximizing a quantity of MSs receiving the broadcast-multicast flows, maximizing a quantity of flows provided, or maximizing revenues generated by provision of the flows. As a result, by allowing broadcast applications server 122 to make an informed decision, overall efficiency of communication system 100 is enhanced over the prior art, subscriber frustration and disappointment with system performance and sub-standard service is reduced, and the goals of an operator of communication system 100 may be implemented and achieved.

Figure 4:
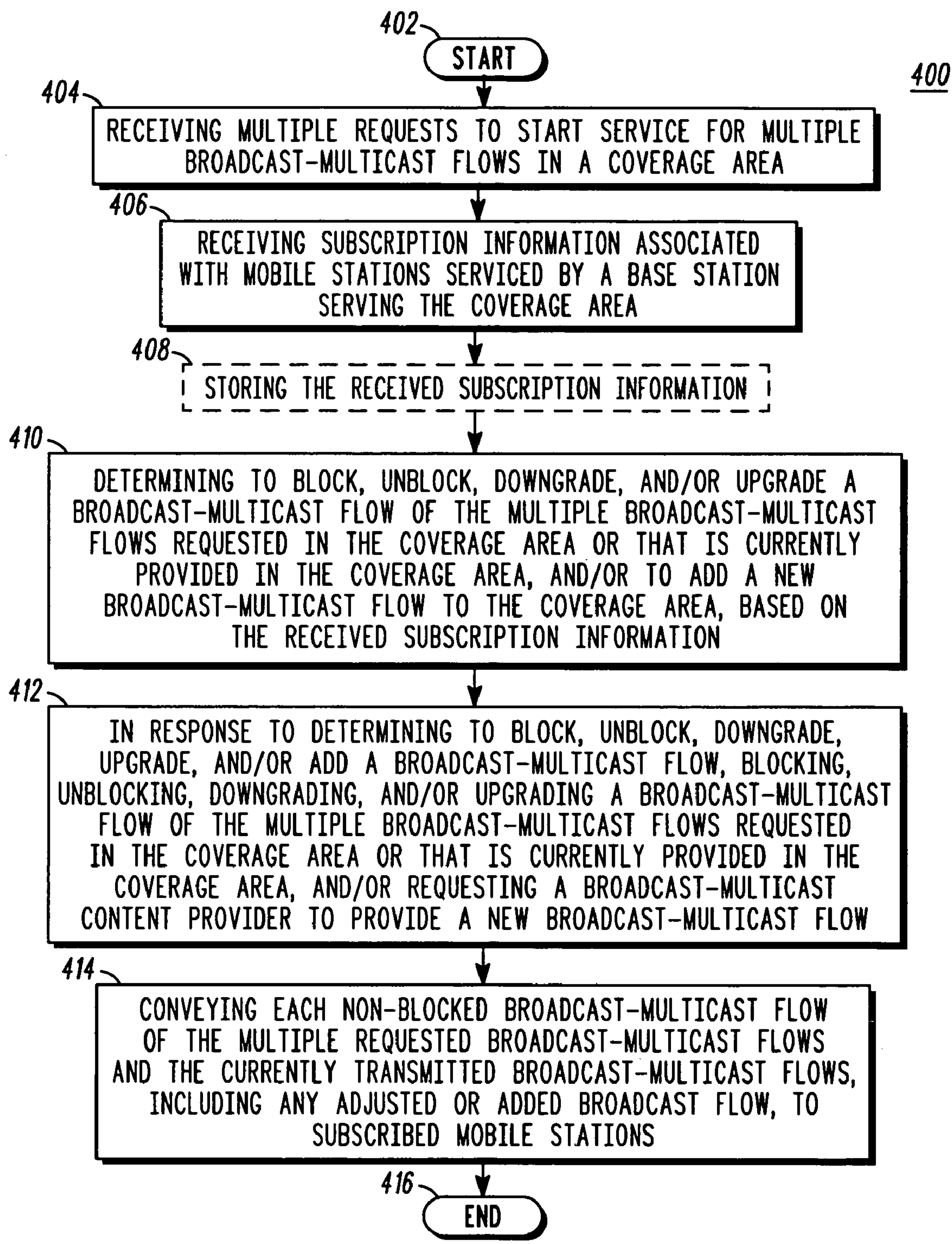
FIG. 4 is a logic flow diagram of a method by which the communication system of FIG. 1 regulates the delivery of a broadcast-multicast service in accordance with another embodiment of the present invention.

FIG. 4 is a logic flow diagram 400 of a method by which communication system 100 regulates the provision of broadcast-multicast services by BS 110 in accordance with another embodiment of the present invention. Similar to logic flow diagram 300, logic flow diagram 400 begins (402) when, similar to step 304, communication system 100, and in particular broadcast applications server 122, receives (404) multiple requests to start service for multiple broadcast-multicast flows in a coverage area, such as coverage area 109, of a BS, that is BS 110, served by the broadcast applications server. Similar to step 304, each request of the multiple requests includes a mobile ID associated with an MS for which the start of the broadcast-multicast flow is being requested and further includes an identifier associated with the requested broadcast-multicast flow.

Broadcast applications server 122 further receives (406) MS-related subscription information in association with each received request. The broadcast applications server may store (408) the received MS-related subscription information in the at least one memory device 126 of the server in association with the received mobile ID and the received broadcast-multicast flow identifier. In one embodiment of the present invention, the MS, such as MS 102, or the BS, that is, BS 110, conveying a request to start service may embed the subscription information in the request, for example, attaching the subscription information as an information element to the request. For example, the request to start service may include a broadcast-multicast service identifier associated with each requested broadcast-multicast service, a QoS associated with each requested broadcast-multicast service, a priority to be accorded to each requested services, and/or an order of preference associated with each requested broadcast-multicast service. The order of preference may be, for example, an absolute order of preference, such as a value between "10" (highest) and "1" (lowest) assigned to the broadcast-multicast service, or a relative order of preference, such as a prioritization of CNN higher than HBO. The request to start service that includes the preference information is then conveyed to broadcast applications server 122 via gateway 116. In another embodiment of the present invention, BS 110 may convey the subscription information to broadcast applications server 122 via gateway 116 in a message separate from the request to start service.

In yet another embodiment of the present invention, broadcast applications server 122 may receive the subscription information by retrieving such information from a network element. That is, in response to receiving each request, and based on the mobile ID, broadcast applications server 122 may query subscriber profile database 128 for information concerning the broadcast-multicast services subscribed to by the associated MS. In response to the query, subscriber profile database 128 may return to broadcast applications server 122 one or more of a listing of broadcast-multicast service identifiers associated with the MS, an order of preference of the broadcast-multicast services, a QoS associated with one or more of the listed broadcast-multicast services that is desired or subscribed to by the user, and any priority to be accorded to the services subscribed to by the MS, such as an indication of a Gold, Silver, or Bronze plan subscribed to by the MS. Broadcast applications server 122 then stores the received subscription information in association with the mobile ID and the broadcast service identifier in the at least one memory device 126 of the server.

Based on the received subscription information, broadcast applications server 122 then determines (410) to block, unblock, downgrade, and/or upgrade, a broadcast-multicast flow of the multiple broadcast-multicast flows that are requested for provision in coverage area 109 or that are currently provided in the coverage area. In addition, or in the alternative, broadcast applications server 122 may determine (410) to add a broadcast-multicast flow to the broadcast-multicast flows provided in coverage area 109, that is, to request a broadcast-multicast content provider 136, 138 to make a new flow available for broadcasting in the coverage area.

In one embodiment of the present invention, based on the subscription information, broadcast applications server 122 may determine to block or downgrade one or more requested or currently provided broadcast-multicast flows due, for example, to a small quantity of MSs subscribed to the flow and residing in the coverage area (although not all subscribed MSs may have requested the flow), to low preferences associated with the one or more flows, to a low MS subscribed-to bandwidth or QoS associated with the one or more flows, or to a low bandwidth or QoS associated with the service plan subscribed to by MSs requesting or receiving the service, such as a bandwidth or a QoS associated with a non-plan or a Bronze plan subscriber.

In another embodiment of the present invention, based on the subscription information, broadcast applications server 122 may determine to unblock or upgrade one or more requested or currently provided broadcast-multicast flows, and/or to add a new broadcast-multicast flow to the flows delivered to coverage area 109, due, for example, to a large quantity of MSs subscribed to the flow and residing in the coverage area (although not all subscribed MSs may have requested the flow), to high preferences associated with the one or more flows, to large MS subscribed-to bandwidth or high QoS associated with the one or more flows, or to large bandwidth or high QoS associated with the service plan subscribed to by MSs requesting or receiving the service, such as the bandwidth or QoS associated with a Gold plan subscriber.

In response to determining to block, unblock, downgrade, or upgrade one or more requested or currently provided broadcast-multicast flows or to add a new broadcast-multicast flow to the flows delivered to coverage area 109, broadcast applications server 122 then blocks, unblocks, downgrades, and or upgrades (412) a broadcast-multicast flow of the multiple requested or currently transmitted broadcast-multicast flows. In addition, or in the alternative, broadcast applications server 122 may add a new broadcast-multicast flow to the broadcast-multicast flows delivered to coverage area 109. When broadcast applications server 122 determines to downgrade or upgrade a broadcast-multicast flow, the server may downgrade or upgrade the flow by adjusting one or more transmission parameters, or the class of service, of the flow. When broadcast applications server 122 determines to add a broadcast-multicast flow, then the server may request a broadcast-multicast content provider 136, 138 to make a new flow available for broadcasting in coverage area 109, which new flow may be specified by the server based on the received subscription information. Broadcast applications server 122 then adds the requested flow to the flows delivered to coverage area 109. Broadcast applications server 122 then conveys (414) each non-blocked broadcast-multicast flow of the multiple requested or on-going broadcast-multicast flows, including any adjusted flows and any added flows, to BS 110. BS 110 broadcasts the broadcast-multicast flows received from broadcast applications server 122 to subscribed MSs and logic flow 400 then ends (416).

In one embodiment of the present invention, in selecting a broadcast-multicast flow to block, unblock, downgrade, upgrade, or add, broadcast applications server 122 may execute an algorithm maintained in at least one memory device 126 that considers the subscription information associated with each MS and received by the server and/or the service transmission parameters maintained by the server in association with each flow. In particular, broadcast applications server 122 may consider an order of preference assigned to each requested service by the associated MS or by the operator of communication system 100. In one such embodiment of the present invention, broadcast applications server 122 may block or downgrade, (for example, reduce a bandwidth of or a QoS of or change a class of service of) a lowest preference broadcast-multicast service. In another such embodiment of the present invention, broadcast applications server 122 may unblock, upgrade (for example, increase a bandwidth of or a QoS of or change a class of service of), or add a highest preference broadcast-multicast service. In yet another such embodiment of the present invention, the algorithm executed by broadcast applications server 122 may consider cumulative orders of preference assigned to each requested service by all requesting MSs. For example, suppose that the orders of preference range from "10" (highest) to "1" (lowest). Further, suppose that MS 102 requests to start service for CNN and assigns an "8" to CNN, while MS 103 and MS 104 each requests to start service for HBO and respectively assign a "3" and a "2" to HBO. The cumulative orders of preference are then an "8" for CNN and a "5" for HBO. As a result, when transmitting both services will produce congestion at BS 110, broadcast applications server 122 may block or adjust the transmission parameters of HBO. By way of another example, when transmitting both services will produce congestion at BS 110, broadcast applications server 122 may consider the preference assigned by each MS to each requested broadcast-multicast service, that is, the preference assigned by each of MSs 102-104 to each of CNN and HBO, rather than only to the service requested by the MS.

In other embodiments of the present invention, in selecting a broadcast-multicast flow to block, unblock, downgrade, upgrade, or add, the algorithm executed by broadcast applications server 122 may further consider, or alternatively consider, operational goals associated with a provision, at BS 110, of each broadcast-multicast service, such as maximizing a quantity of MSs receiving the broadcast-multicast flows, maximizing a quantity of flows provided, or maximizing revenues generated by provision of the flows. For example, when broadcast applications server 122 retrieves the subscriber profile of each MS 102-104 serviced by BS 110 and requesting to start a broadcast-multicast service, the profile may include the price of each broadcast-multicast service subscribed to by the MS. When broadcast applications server 122 determines to block, to transmit at a reduced bandwidth, to transmit at a reduced QoS, or to transmit at a different class of service one or more broadcast-multicast services, the broadcast applications server may block or adjust the transmission parameters of services in inverse order to the revenues that will be generated by provision of such services at the BS.

By providing subscriber information to broadcast applications server 122 when the server receives a request to start service, the server is able to make an intelligent decision in regard to blocking, unblocking, downgrading, upgrading, and adding a broadcast-multicast flow. For example, broadcast applications server 122 may block, reduce a bandwidth or QoS, or change the class of service of a broadcast-multicast flow due to a small quantity of MSs subscribed to the flow and residing in the coverage area, to low preferences associated with the one or more flows, to a low MS subscribed-to bandwidth or QoS associated with the one or more flows, or to a low bandwidth or QoS associated with the service plan subscribed to by MSs requesting or receiving the service, such as a bandwidth or a QoS associated with a non-plan or a Bronze plan subscriber. By way of another example, broadcast applications server 122 may determine to unblock, upgrade, or add a broadcast-multicast flow due to a large quantity of MSs subscribed to the flow and residing in the coverage area, to high preferences associated with the one or more flows, to large MS subscribed-to bandwidth or high QoS associated with the one or more flows, or to large bandwidth or high QoS associated with the service plan subscribed to by MSs requesting or receiving the service, such as the bandwidth or QoS associated with a Gold plan subscriber. Again, by allowing broadcast applications server 122 to make an informed decision, overall efficiency of communication system 100 is enhanced over the prior art, subscriber frustration and disappointment with system performance and sub-standard service is reduced, and the goals of the operator of communication system 100 may be implemented and achieved.

Figure 5:
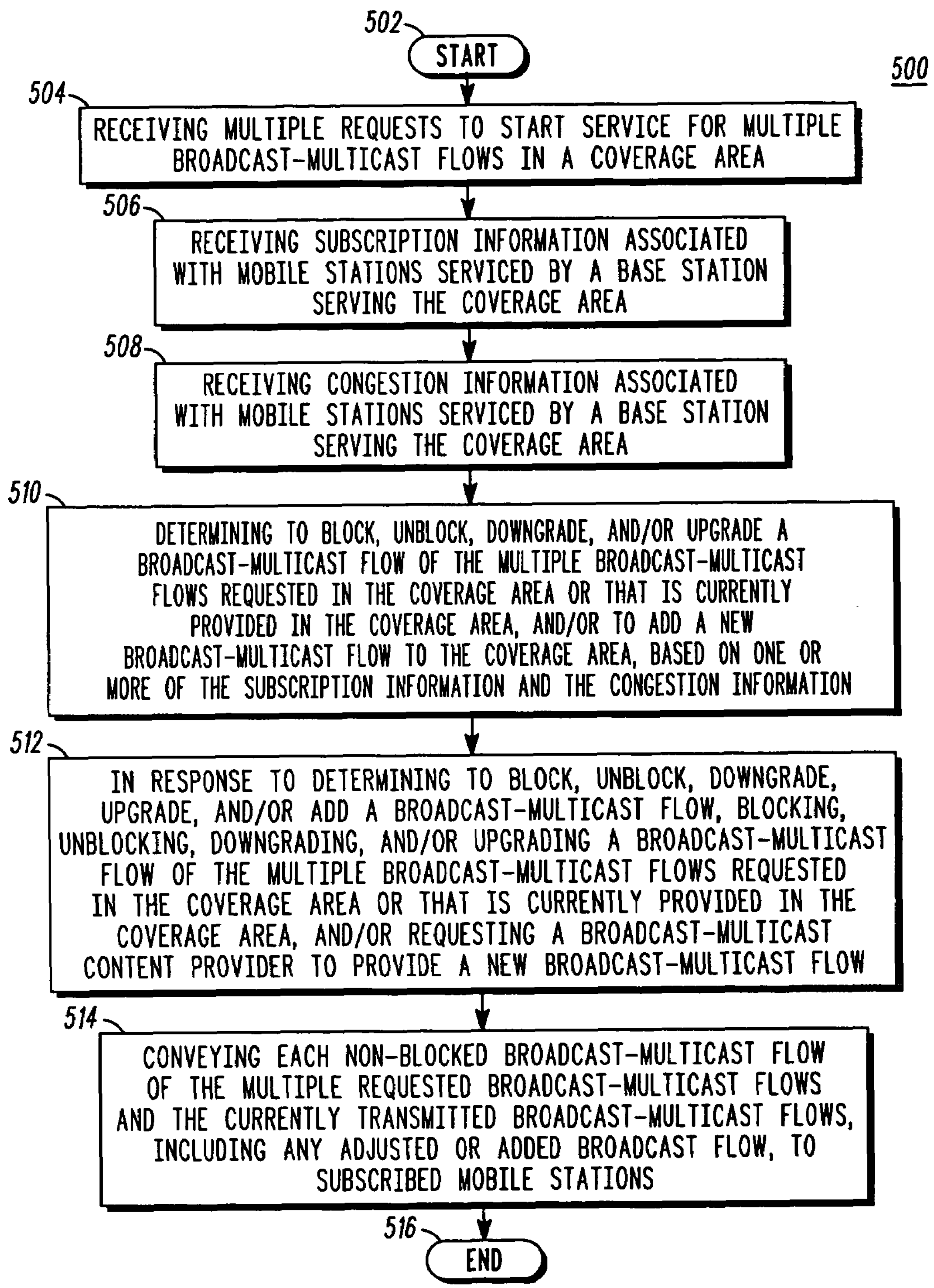
FIG. 5 is a logic flow diagram of a method by which the communication system of FIG. 1 regulates the delivery of a broadcast-multicast service in accordance with another embodiment of the present invention.

FIG. 5 is a logic flow diagram 500 of a method by which communication system 100 regulates the provision of broadcast-multicast services by BS 110 in accordance with yet another embodiment of the present invention. Similar to logic flow diagrams 300 and 400, logic flow diagram 500 begins (502) when communication system 100, and in particular broadcast applications server 122, receives (504) multiple requests to start service for multiple broadcast-multicast flows in a coverage area, such as coverage area 109, of a BS, that is BS 110, served by the broadcast applications server. Similar to steps 304 and 404, each request of the multiple requests includes a mobile ID associated with an MS for which the start of the broadcast-multicast flow is being requested and further includes an identifier associated with the requested broadcast-multicast flow and may be received from an MS sourcing the request or from a network element.

Broadcast applications server 122 further receives (506) MS-related subscription information in association with each received request and receives (508) congestion information from BS 110, which information is described in greater detail above. Broadcast applications server 122 may further store the received subscription information and congestion information in at least one memory device 126. Based on the received subscription information and the received congestion information, broadcast applications server 122 then determines (510) to block, unblock, downgrade, and/or upgrade a broadcast-multicast flow of the multiple broadcast-multicast flows that are requested for provision in coverage area 109 or are currently provided in coverage area 109 and/or to add a new broadcast-multicast flow to the broadcast-multicast flows delivered to coverage area 109.

In one embodiment of the present invention, broadcast applications server 122 may determine, based on the congestion information, that delivering all requested broadcast-multicast flows to coverage area 109 would congest the coverage area, as is described in greater detail above with respect to step 310, and that one or more of the requested and/or currently transmitted broadcast-multicast flows should be blocked or downgraded. Alternatively, broadcast applications server 122 may determine, based on the congestion information, that BS 110 can support additional broadcast-multicast flows and that one or more of the requested and/or currently transmitted broadcast-multicast flows may be unblocked or upgraded or a new flow may be added. Broadcast applications server 122 may then determine, based on one or more of the subscription information, the congestion information, and the service information, to block, unblock, downgrade, or upgrade one or more requested or currently provided broadcast-multicast flows or to add a new flow. For example, broadcast applications server 122 may rank the broadcast-multicast flows based on the received subscription information and then, based on the congestion information, determine one or more ranking thresholds such that a flow ranked below a ranking threshold may be blocked, transmitted at a reduced bandwidth, transmitted at a reduced QoS, and/or transmitted at a different class of service. For example, broadcast-multicast flows of lowest preference, that is, falling below a lowest threshold, may be blocked and broadcast-multicast flows of mid-level preference, that is, falling below a higher threshold, may be transmitted at a reduced bandwidth or at a reduced QoS.

In another embodiment of the present invention, broadcast applications server 122 may determine, based on the subscription information and as described above with respect to step 410, that one or more requested or currently transmitted broadcast-multicast flows may be blocked, unblocked, downgraded, and/or upgraded, and/or that a new flow may be added, and then determine, based on one or more of the subscription information, the congestion information, and the service information, to block, unblock, downgrade, upgrade, and/or add one or more broadcast-multicast flows.

Broadcast applications server 122 then conveys (516) each non-blocked broadcast-multicast flow of the multiple requested or on-going broadcast-multicast flows, including any adjusted and added flows, to BS 110. BS 110 broadcasts the broadcast-multicast flows received from broadcast applications server 122 to subscribed MSs and logic flow 500 then ends (518).

By providing congestion information and subscriber information to broadcast applications server 122 when the server receives a request to start service, the server is best able to make an informed, intelligent decision concerning blocking, unblocking, downgrading, and/or upgrading a broadcast-multicast flow, and/or whether to add a new broadcast-multicast flow the broadcast-multicast flows delivered to coverage area 109. Once again, by allowing broadcast applications server 122 to make an informed decision as opposed to the arbitrary blocking and downgrading of broadcast-multicast flows performed by a base station in the prior art, overall efficiency of communication system 100 is enhanced, subscriber frustration and disappointment with system performance and sub-standard service is reduced, and the goals of the operator of communication system 100 may be implemented and achieved.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing a broadcast-multicast service comprising:

receiving at least one request to start service for a plurality of broadcast-multicast flows in a coverage area of a same base station;

receiving information concerning congestion in the coverage area;

determining one or more of blocking a broadcast-multicast flow of the plurality of broadcast-multicast flows, unblocking a broadcast-multicast flow of the plurality of broadcast-multicast flows, downgrading a broadcast-multicast flow of the plurality of broadcast-multicast flows, upgrading a broadcast-multicast flow of the plurality of broadcast-multicast flows, and adding a new broadcast-multicast flow for delivery in the coverage area based on the received congestion information;

in response to determining to block a broadcast-multicast flow, blocking a transmission of the broadcast-multicast flow in the coverage area;

in response to determining to unblock a broadcast-multicast flow, unblocking a transmission of the broadcast-multicast flow in the coverage area;

in response to determining to downgrade a broadcast-multicast flow, downgrading a broadcast-multicast flow prior to transmitting the broadcast-multicast flow in the coverage area; and in response to determining to upgrade a broadcast-multicast flow, upgrading a broadcast-multicast flow prior to transmitting the broadcast-multicast flow in the coverage area; and in response to determining to add a new broadcast-multicast flow, adding a new broadcast-multicast flow in the coverage area.

2. The method of claim 1, further comprising, in response to determining to add a new broadcast-multicast flow for delivery in the coverage area, requesting a new broadcast-multicast flow from a broadcast-multicast content provider.

3. The method of claim 1, wherein receiving at least one request comprises receiving at least one request to start service from at least one subscriber to one or more broadcast-multicast flows of the plurality of broadcast-multicast flow.

4. The method of claim 1, wherein receiving at least one request comprises:

determining, by a first network element, the presence of a subscriber to a broadcast-multicast flow of the plurality of broadcast-multicast flows;

in response to determining the presence of the subscriber, generating a request to start service for an associated broadcast-multicast flow;

conveying the request to start service to a second network element; and receiving, by the second network element, the request.

5. The method of claim 1, wherein receiving information concerning congestion in a coverage area comprises:

requesting information on one or more of an availability of RF resources and channel conditions; and in response to requesting information, receiving information on one or more of an availability of RF resources in a coverage area where the plurality of broadcast-multicast flows are to be provided and channel conditions in the coverage area.

6. The method of claim 1, wherein receiving information concerning congestion in the coverage area comprises receiving information on one or more of congestion levels and bandwidth availability in a coverage area where the plurality of broadcast-multicast flows are to be provided.

7. The method of claim 1, further comprising allocating a bandwidth to a broadcast-multicast flow of the plurality of broadcast-multicast flows that is different than a bandwidth associated with the broadcast-multicast flow.

8. The method of claim 1, wherein determining one or more of blocking, unblocking, downgrading, and upgrading a broadcast-multicast flow of the plurality of broadcast-multicast flows, and adding a new broadcast-multicast flow based on the received congestion information comprises determining one or more of blocking, unblocking, downgrading, and upgrading a broadcast-multicast flow based on the received congestion information and further based on a transmission parameter associated with each broadcast-multicast flow of the plurality of broadcast-multicast flows.

9. The method of claim 8, wherein the transmission parameter associated with each broadcast-multicast flow of the plurality of broadcast-multicast flows comprises one or more of a bandwidth requirement and a class of service associated with the broadcast-multicast flow.

10. The method of claim 8, further comprising assigning a quality of service to a broadcast-multicast flow of the plurality of broadcast-multicast flows that is different than a quality of service associated with the broadcast-multicast flow.

11. The method of claim 1, further comprising, in response to receiving information concerning congestion in the coverage area, adjusting a transmission parameter of one or more currently transmitted broadcast-multicast flows.

12. The method of claim 1, further comprising, in response to receiving information concerning congestion in the coverage area, blocking the transmission of one or more currently transmitted broadcast-multicast flows.

13. The method of claim 1, further comprising, in response to receiving information concerning congestion in the coverage area, unblocking the transmission of one or more currently transmitted broadcast-multicast flows.

14. The method of claim 1, further comprising receiving preferences associated with each broadcast-multicast flow of the plurality of broadcast-multicast flows and wherein determining one or more of blocking, unblocking, downgrading, upgrading, and adding a broadcast-multicast flow comprises determining one or more of blocking unblocking, downgrading, upgrading, and adding a broadcast-multicast flow based on the received congestion information and further based on the received preferences.

15. The method of claim 1, wherein determining one or more of blocking, unblocking, downgrading, upgrading, and adding a broadcast-multicast flow of the plurality of broadcast-multicast flows comprises determining one or more of unblocking, downgrading, upgrading and adding a broadcast-multicast based on the received congestion information and further based on a maximization of an operational goal.

16. The method of claim 15, wherein the maximization of an operational goal comprises one or more of a maximization of a number of broadcast-multicast flows provided in the coverage area, a maximization of a number of mobile stations provided broadcast-multicast flows, and a maximization of a revenue associated with the determined one or more broadcast-multicast flows.

17. A method for providing a broadcast-multicast service comprising:

receiving at least one request to start service for a plurality of broadcast-multicast flows in a coverage area of a same base station;

receiving preference information associated with the plurality of broadcast-multicast flows;

determining one or more of blocking a broadcast-multicast flow of the plurality of broadcast-multicast flows, unblocking a broadcast-multicast flow of the plurality of broadcast-multicast flows, downgrading a broadcast-multicast flow of the plurality of broadcast-multicast flows, upgrading a broadcast-multicast flow of the plurality of broadcast-multicast flows, and adding a new broadcast-multicast flow for delivery in the coverage area based on the received preference information;

in response to determining to block, blocking a transmission of a broadcast-multicast flow in the coverage area;

in response to determining to unblock, unblocking a transmission of a broadcast-multicast flow in the coverage area;

in response to determining to downgrade, downgrading a broadcast-multicast flow prior to transmission in the coverage area;

in response to determining to upgrade, upgrading a broadcast-multicast flow prior to transmission in the coverage area; and in response to determining to add, adding a new broadcast-multicast flow in the coverage area.

18. The method of claim 17, further comprising, in response to determining to add a new broadcast-multicast flow for delivery in the coverage area, requesting a new broadcast-multicast flow from a broadcast-multicast content provider.

19. The method of claim 17, wherein receiving requests comprises receiving one or more requests to start service from one or more subscribers to one or more broadcast-multicast flows of the plurality of broadcast-multicast flows.

20. The method of claim 17, wherein receiving requests comprises receiving requests from a network element of a wireless network to start service for a plurality of broadcast-multicast flows.

21. The method of claim 17, wherein the at least one request comprises a listing of the plurality of broadcast-multicast flows and further comprises an indication of an order of preference of the listed broadcast-multicast flows.

22. The method of claim 21, further comprising maintaining an order of preference of the plurality of broadcast-multicast flows in a mobile station and wherein the at least one request and the preference information are received from the mobile station.

23. The method of claim 17, further comprising maintaining an order of preference of the plurality of broadcast-multicast flows in a network element and in association with a mobile station and wherein receiving preference information comprises conveying, to the network element, a request for preference information that identifies the mobile station and, in response to conveying the request, receiving an indication of an order of preference of the plurality of broadcast-multicast flows.

24. The method of claim 17, wherein determining one or more of blocking, unblocking downgrading, upgrading, and adding a broadcast-multicast flow comprises determining one or more of blocking unblocking downgrading, upgrading, and adding a broadcast-multicast flow based on the received preference information and further based on a maximization of an operational goal.

25. The method of claim 24, wherein the maximization of an operational goal comprises one or more of a maximization of a number of broadcast-multicast flows provided in the coverage area, a maximization of a number of mobile stations provided broadcast-multicast flows, and a maximization of a revenue associated with the determined one or more broadcast-multicast flows.

26. The method of claim 17, wherein receiving preference information comprises preference information being available at a network gateway and conveyed by the gateway to a broadcast application server.

27. The method of claim 17, wherein receiving preference information comprises retrieving preference information by a broadcast application server from a database.

28. A broadcast applications server comprising a processor that receives at least one request to start service for a plurality of broadcast-multicast flows in a coverage area of a same base station, receives information concerning congestion in the coverage area, determines one or more of blocking a broadcast-multicast flow of the plurality of broadcast-multicast flows, unblocking a broadcast-multicast flow of the plurality of broadcast-multicast flows, downgrading a broadcast-multicast flow of the plurality of broadcast-multicast flows, upgrading a broadcast-multicast flow of the plurality of broadcast-multicast flows, and adding a new broadcast-multicast flow for delivery in the coverage area based on the received congestion information, in response to determining to block a broadcast-multicast flow, blocks a transmission of the broadcast-multicast flow in the coverage area, in response to determining to unblock a broadcast-multicast flow, unblocks a transmission of the broadcast-multicast flow in the coverage area, in response to determining to downgrade a broadcast-multicast flow, downgrades a broadcast-multicast flow prior to transmission of the broadcast-multicast flow in the coverage area, and in response to determining to upgrade a broadcast-multicast flow, upgrades a broadcast-multicast flow prior to transmission of the broadcast-multicast flow in the coverage area, and in response to determining to add a new broadcast-multicast flow, adds a new broadcast-multicast flow in the coverage area.

29. The broadcast applications server of claim 28, wherein the processor, in response to determining to add a new broadcast-multicast flow for delivery in the coverage area, conveys a request for a new broadcast-multicast flow from a broadcast-multicast content provider.

30. The broadcast applications server of claim 28, wherein the processor receives at least one request by receiving at least one request to start service from at least one subscriber to one or more broadcast-multicast flows of the plurality of broadcast-multicast flows.

31. The broadcast applications server of claim 28, wherein the processor receives at least one request by receiving at least one request from a network element of a wireless network to start service for a plurality of broadcast-multicast flows.

32. The broadcast applications server of claim 28, wherein the processor receives information congestion in the coverage area in a coverage area by requesting information on one or more of an availability of RF resources and channel conditions and, in response to requesting information, receiving information on one or more of an availability of RF resources in a coverage area where the plurality of broadcast-multicast flows are to be provided and channel conditions in the coverage area.

33. The broadcast applications server of claim 28, wherein the processor receives information concerning congestion in the coverage area in the coverage area by receiving information on one or more of congestion levels and bandwidth availability in a coverage area where the plurality of broadcast-multicast flows are to be provided.

34. The broadcast applications server of claim 28, wherein the processor further allocates a bandwidth to a broadcast-multicast flow of the plurality of broadcast-multicast flows that is different than a bandwidth associated with the broadcast-multicast flow.

35. The broadcast applications server of claim 28, wherein the processor determines one or more of blocking, unblocking, downgrading, upgrading, and adding a broadcast-multicast flow by determining one or more of blocking, unblocking, downgrading, upgrading, and adding a broadcast-multicast flow of the plurality of broadcast-multicast flows based on the received congestion information and further based on a quality of service associated with each broadcast-multicast flow of the plurality of broadcast-multicast flows.

36. The broadcast applications server of claim 35, wherein the quality of service associated with each broadcast-multicast flow of the plurality of broadcast-multicast flows comprises one or more of a bandwidth requirement and a class of service associated with the broadcast-multicast flow.

37. The broadcast applications server of claim 35, wherein the processor further assigns a quality of service to a broadcast-multicast flow of the plurality of broadcast-multicast flows that is different than a quality of service associated with the broadcast-multicast flow.

38. The broadcast applications server of claim 28, wherein the processor further, in response to receiving information congestion in the coverage area, adjusts a transmission parameter of one or more currently transmitted broadcast-multicast flows.

39. The broadcast applications server of claim 28, wherein the processor further, in response to receiving information congestion in the coverage area, blocks the transmission of one or more currently transmitted broadcast-multicast flows.

40. The broadcast applications server of claim 28, wherein the processor further, in response to receiving information congestion in the coverage area, unblocks the transmission of one or more currently transmitted broadcast-multicast flows.

41. The broadcast applications server of claim 28, wherein the processor further receives preferences associated with each broadcast-multicast flow of the plurality of broadcast-multicast flows and wherein the processor determines one or more of blocking, unblocking, downgrading, upgrading, and adding a broadcast-multicast by determining one or more of blocking, unblocking, downgrading, upgrading, and adding a broadcast-multicast flow of the plurality of broadcast-multicast flows based on the received congestion information and further based on the received preferences.

42. The broadcast applications server of claim 28, wherein the processor determines one or more of blocking, unblocking, downgrading, upgrading, and adding a broadcast-multicast flow by determining one or more of blocking, unblocking, downgrading, upgrading, and adding a broadcast-multicast flow based on the received congestion information and further based on a maximization of an operational goal.

43. The broadcast applications server of claim 42, wherein the maximization of an operational goal comprises one or more of a maximization of a number of broad broadcast-multicast cast flows provided in the coverage area, a maximization of a number of mobile stations provided to broadcast-multicast flows, and a maximization of a revenue associated with the determined one or more broadcast-multicast flows.

44. A broadcast applications server comprising a processor that receives at least one request to start service for a plurality of broadcast-multicast flows in a coverage area of a same base station, receives preference information associated with the plurality of broadcast-multicast flows, determines one or more of blocking a broadcast-multicast flow of the plurality of broadcast-multicast flows, unblocking a broadcast-multicast flow of the plurality of broadcast-multicast flows, downgrading a broadcast-multicast flow of the plurality of broadcast-multicast flows, upgrading a broadcast-multicast flow of the plurality of broadcast-multicast flows or unblocking a broadcast-multicast flow of the plurality of broadcast-multicast flows, and adding a new broadcast-multicast flow for delivery in the coverage area based on the received preference information, in response to determining to block a broadcast-multicast flow, blocks a transmission of a broadcast-multicast flow in the coverage area, in response to determining to unblock a broadcast-multicast flow, unblocks a transmission of a broadcast-multicast flow in the coverage area, in response to downgrade a broadcast-multicast flow, downgrades a broadcast-multicast flow prior to transmitting the broadcast-multicast flow in the coverage area, and in response to determining to upgrade a broadcast-multicast flow, upgrades a broadcast-multicast flow prior to transmitting the broadcast-multicast flow in the coverage area.

45. The broadcast applications server of claim 44, wherein the processor, in response to determining to add a new broadcast-multicast flow for delivery in the coverage area, conveys a request for a new broadcast-multicast flow from a broadcast-multicast content provider.

46. The broadcast applications server of claim 44, wherein the processor receives requests by receiving one or more requests to start service from one or more subscribers to one or more broadcast-multicast flow of the plurality of broadcast-multicast flows.

47. The broadcast applications server of claim 44, wherein the processor receives requests by receiving requests from a network element of a wireless network to start service for a plurality of broadcast-multicast flows.

48. The broadcast applications server of claim 44, wherein the at least one request comprises a listing of the plurality of broadcast-multicast flows and further comprises an indication of an order of preference of the listed broadcast-multicast flows.

49. The broadcast applications server of claim 48, further comprising at least one memory device and wherein the processor further stores, in the at least one memory device, an order of preference of the plurality of broadcast-multicast flows in a mobile station and wherein the at least one request and the preference information are received from the mobile station.

50. The broadcast applications server of claim 44, wherein the processor determines one or more of blocking, unblocking, downgrading, upgrading, and adding a broadcast-multicast flow by determining one or more of blocking, unblocking, downgrading, upgrading, and adding a broadcast-multicast based on the received preference information and further based on a maximization of an operational goal.

51. The broadcast applications server of claim 50, wherein the maximization of an operational goal comprises one or more of a maximization of a number of broadcast-multicast flows provided in the coverage area, a maximization of a number of mobile stations provided broadcast-multicast flows, and a maximization of a revenue associated with the determined one or more broadcast-multicast flows.

52. The broadcast applications server of claim 44, wherein the broadcast applications server receives preference information from a network gateway.

53. The broadcast applications server of claim 52, wherein the broadcast applications server receives preference information by retrieving the preference information from a database.

* * * * *